(12) United States Patent
Dietrich

(10) Patent No.: US 8,037,668 B2
(45) Date of Patent: *Oct. 18, 2011

(54) CROP ACCESSORY ATTACHMENT

(76) Inventor: Dave Dietrich, Assiniboia (CA)

( * ) Notice: Subject to any disclaimer, the term of this patent is extended or adjusted under 35 U.S.C. 154(b) by 285 days.

This patent is subject to a terminal disclaimer.

(21) Appl. No.: 11/990,434

(22) PCT Filed: Aug. 16, 2006

(86) PCT No.: PCT/CA2006/001366
§ 371 (c)(1),
(2), (4) Date: Aug. 10, 2009

(87) PCT Pub. No.: WO2007/019705
PCT Pub. Date: Feb. 22, 2007

(65) Prior Publication Data
US 2010/0005771 A1    Jan. 14, 2010

(30) Foreign Application Priority Data
Aug. 18, 2005 (CA) .................................. 2,516,252

(51) Int. Cl.
*A01D 34/00* (2006.01)
(52) U.S. Cl. ............................................ 56/312; 56/313
(58) Field of Classification Search ............... 56/119, 56/312, 313, 314
See application file for complete search history.

(56) References Cited

U.S. PATENT DOCUMENTS

| | | | |
|---|---|---|---|
| 700,029 A | 5/1902 | Gatermann | |
| 791,022 A | 5/1905 | Gaterman | |
| 2,104,217 A * | 1/1938 | Barnes | 292/356 |
| 2,734,332 A | 2/1956 | Fisher | |
| 2,892,298 A | 6/1959 | Chaney | |
| 4,120,138 A | 10/1978 | Schumacher et al. | |
| 4,295,328 A | 10/1981 | Schumacher et al. | |
| 6,442,919 B1 | 9/2002 | Schumacher et al. | |
| 7,520,119 B2 * | 4/2009 | Yanko | 56/312 |
| 7,650,738 B2 * | 1/2010 | Dietrich | 56/314 |
| 2003/0005678 A1 | 1/2003 | Schumacher et al. | |

FOREIGN PATENT DOCUMENTS

| | | |
|---|---|---|
| CA | 548220 | 11/1957 |
| CA | 719825 | 10/1965 |

OTHER PUBLICATIONS

International Search Report for PCT/CA2006/001366 dated Dec. 12, 2006.

* cited by examiner

*Primary Examiner* — Alicia Torres
(74) *Attorney, Agent, or Firm* — Nixon & Vanderhye P.C.

(57) ABSTRACT

A crop accessory apparatus comprises a header latch member adapted for attachment to a guard bolt on a cutting header such that a rear wall of the header latch member slopes rearward from a distal end thereof and toward the header. A crop accessory has an accessory latch member at a rear end thereof comprising a spring element defining an aperture and biased toward the header, wherein during engagement the distal end of the header latch member moves into the aperture and a rear edge of the aperture is urged down the sloping rear wall and rearward, urging the accessory rearward into closer engagement with the header. A lateral retention groove in the sloping rear wall is operative to prevent the rear edge of the aperture in the spring element from sliding up and off the header latch member.

9 Claims, 2 Drawing Sheets

CROP ACCESSORY ATTACHMENT

This application is the U.S. national phase of International Application No. PCT/CA2006/001366 filed 16 Aug. 2006 which designated the U.S. and claims priority to Canadian Application No. 2,516,252 filed 18 Aug. 2005, the entire contents of each of which are hereby incorporated by reference.

This invention is in the field of cutting headers such as are used in agriculture for cutting crops for harvest and the like, and in particular with crop lifters and like accessories such as are mounted on such headers to increase crop gathering and retention in the harvesting machine.

BACKGROUND

For various reasons crops sometimes are lying so close to the ground that it is difficult to cut them with a conventional harvest header. Some crops are inherently short, while others may be taller, but are prone to fall down when they reach maturity. Heavy rain or hail can also cause crop to be lying close to the ground at harvest time.

Typically the knife on cutting headers comprises a knife bar extending along the front lower edge of the header, with a plurality of triangular knife sections attached to the bar such that the apex of the triangle extends forward from the bar. The exposed side edges of the knife sections are sharpened. Guards are attached to the front lower edge of the header and serve to protect the knife sections from breakage when contacting stones and like obstructions. The guards comprise pointed guard fingers extending forward, and the knife moves back and forth along the edge of the header in a slot cut laterally through the guard fingers. In addition to protecting the knife, the guard fingers also enable the knife sections to cut the crop. As the knife section moves back and forth it pushes crop against the sides of those portions of the guard finger that are above and below the slot, shearing the crop stalks.

A conventional knife is a few inches above the ground when the header is in its lowest position, such that very short or downed crop material will pass under the knife and be lost. Many different kinds of "crop lifters", as they have come to be known, have been developed over the last century and more. Typically these crop lifters are attached to the header and/or the forward extending point of the guard finger, and provide an arm of various designs that rides along the ground ahead of the knife. A lifting finger extends at a shallow angle from the front of the arm back and over the knife. As the header moves down the field, the arm rides along the ground and under the downed crop stalks, which then are lifted and pass over the lifting finger to the knife, where they are cut and continue moving onto the header from where they can be passed to the harvester, swather table, or the like.

U.S. Pat. Nos. 700,029 and 791,022 to Gatermann, U.S. Pat. No. 2,734,332 to Fisher, U.S. Pat. No. 2,892,298 to Chaney, U.S. Pat. No. 2,960,814 to Babcock, and Canadian Patent Number 407,654 to Young disclose such a crop lifter that is pivotally attached to the header so as to be able to move up and down to follow the ground. The Babcock and Fisher devices float on the ground, while the others are biased toward the ground by springs. U.S. Pat. No. 4,120,138 to Schumacher illustrates a crop lifter that is fixed to the header instead of pivoting, but is made of spring steel so that same may move up and down to follow the ground.

Crop lifters interfere somewhat with normal operations of the header when harvesting taller crops with the header raised a substantial distance above the ground. During turns in particular, because the crop lifters generally extend a considerable distance ahead of the header, some crop stalks are pushed over and not cut. It is common practice therefore to remove the crop lifters when using the header on taller crops. In view of this there is also considerable prior art directed to providing a crop lifter that is easily installed and removed.

U.S. Pat. No. 3,579,967 to Schumacher discloses a quick attachment mechanism for a crop lifter. A rear end of a springy arm of the crop lifter defines a notch between legs that fit into an annular leg groove in a nut that attaches the guard to the header. The extreme rear end of the legs of the notched portion are bent down, such that the legs can only be inserted into the leg groove when the front end of the arm is tilted downward. After insertion, the front end of the arm is raised, and a hook is placed over the guard finger to lock the arm in tension and in the raised position. With the arm so raised, the bent portion at the rear of the arm prevents the arm from moving forward and disengaging the grooved nut.

U.S. Pat. Nos. 4,295,328 and 6,442,919 and United States Patent Application Publication 2003/0005678 of Schumacher disclose quick attachment mechanisms for crop lifters that use the bent rear notch and provide alternate mechanisms using springs, clips and the like to hold the arm in the raised position by releasably securing the arm to the guard finger.

Canadian Patent Numbers 548,220 to A. Claas and 719,825 to R. Claas disclose a quick attachment mechanism for a crop lifter that attaches only to the guard finger with a spring biased clamp.

SUMMARY OF THE INVENTION

It is an object of the present invention to provide a crop accessory attachment mechanism that overcomes problems in the prior art.

The present invention provides, in a first embodiment, a crop accessory apparatus for attachment to a cutting header. The cutting header has a knife mounted along a lower front edge thereof and guards attached to the lower front edge with guard bolts such that guard fingers of the guards extend forward from the header. The apparatus comprises a header latch member adapted for attachment to a guard bolt on the header such that a proximate end of the header latch member is adjacent to the header, and such that a sloping rear wall of the header latch member slopes from a distal end of the header latch member rearward and toward the header. A crop accessory has an accessory latch member at a rear end thereof, the accessory latch member adapted to move rearward, when the header latch member is attached to a header, into latching engagement with the header latch member such that the rear end of the accessory is maintained in substantially fixed vertical and lateral relationship to the header. The accessory latch member comprises a spring element defining an aperture therein, wherein the distal end of the header latch member moves into the aperture when the accessory latch member is engaged with the header latch member, and wherein the spring element is urged toward the header by a bias force such that a rear edge of the aperture is urged down the sloping rear wall and rearward, and such that the accessory is urged rearward into closer engagement with the header. A lateral retention groove in the sloping rear wall in proximity to the distal end of the header latch member is operative to prevent the rear edge of the aperture in the spring element from sliding up and off the header latch member.

The present invention provides, in a second embodiment, a crop accessory apparatus for attachment to a cutting header. The cutting header has a knife mounted along a lower front edge thereof and guards attached to the lower front edge with guard bolts such that guard fingers of the guards extend forward from the header. The apparatus comprises a header latch member having a distal portion with a sloping conical wall, the header latch member adapted for attachment to a guard bolt on the header such that a proximate end of the header latch member is adjacent to the header, and a conical distal end points away from the header. A crop accessory has an accessory latch member at a rear end thereof, the accessory latch member adapted to move rearward, when the header latch member is attached to a header, into latching engagement with the header latch member such that the rear end of the accessory is maintained in substantially fixed vertical and lateral relationship to the header. The accessory latch member comprises a spring element defining an aperture therein, wherein the distal end of the header latch member moves into the aperture when the accessory latch member is engaged with the header latch member, and wherein the spring element is urged toward the header by a bias force such that a rear edge of the aperture is urged down the conical wall and rearward, and such that the accessory is urged rearward into closer engagement with the header. An annular retention groove around the conical wall in proximity to the distal end of the header latch member is operative to prevent the rear edge of the aperture in the spring element from sliding up and off the header latch member.

The present invention thus provides a crop lifter, sunflower pan, or like crop accessory that attaches quickly to the header and is readily releasable therefrom, and yet resists the tendency of the accessory latch member and header latch member to disengage under some field conditions. Conveniently a mid-portion of the accessory engages one or more guard fingers to secure the accessory to the header.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
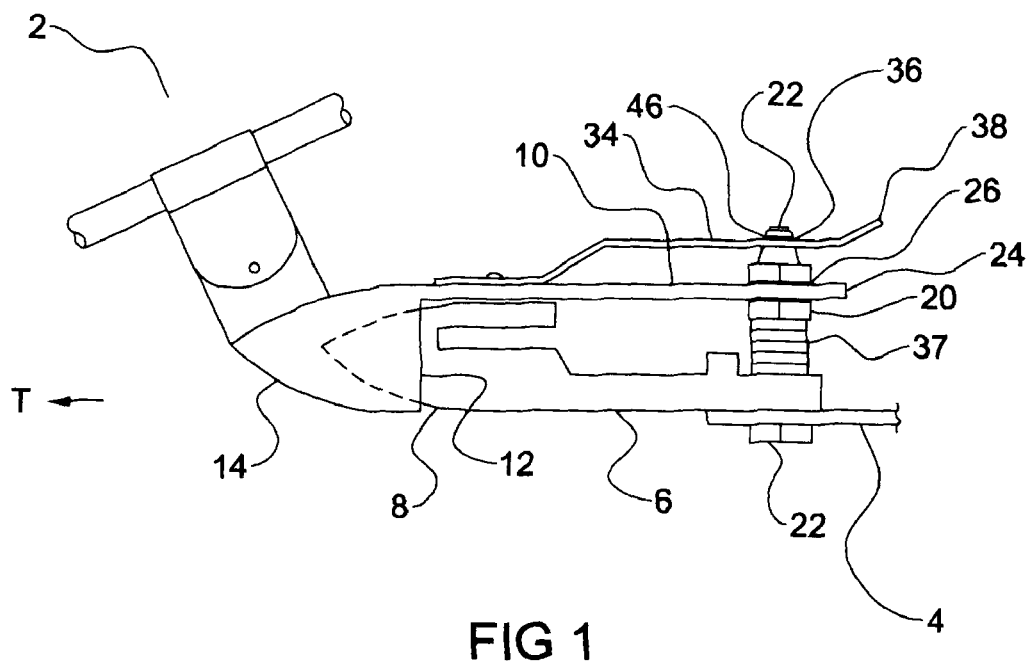
FIG. 1 is a side view of one type crop lifter attached to the top of a header with a releasable latch mechanism.

FIG. 1 illustrates a crop lifter 2 mounted on a cutting header 4 of the prior art having a knife and cooperating guards 6 mounted along a lower front edge thereof. The guards 6 have guard fingers 8 extending forward from header 4. The header is designed to travel along a field in an operating travel direction T.

Figure 2:
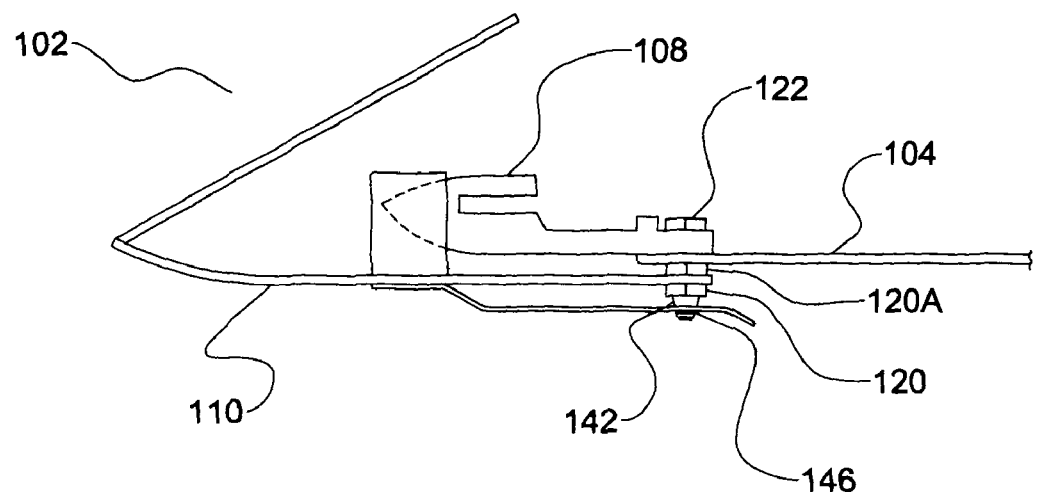
FIG. 2 is a side view of a second type of crop lifter attached to the bottom of a header with a releasable latch mechanism similar to that of FIG. 1.

Such crop lifters are known in a wide variety of configurations. FIG. 2, for example, illustrates an alternate crop lifter 102 mounted on a guard finger 108 attached to a cutting header 104.

FIG. 1 illustrates a crop lifter 2 that can be quickly installed on the header 4 by sliding the lifter arm 10 rearward such that the guard finger 8 of a guard 6 attached to the header 4 engages a guard finger aperture 12 in an aperture member 14 on the lifter arm 10 and the rear end of the lifter arm 10 moves into latching engagement with the header 4. The accessory such as the illustrated crop lifter has an accessory or arm latch member 24 at a rear end thereof and moves rearward into latching engagement with a header latch member 20 attached to the header 4.

The header latch member 20 is adapted for attachment to a guard bolt 22 that attaches the guard 6 to the header 4. The header latch member 20 defines a threaded hole therethrough and is threaded on to the guard bolt 22 in replacement for the nut that would ordinarily be used to secure the guard 6 to the header 4. Alternatively, the head of the guard bolt could be configured to provide the header latch member 20, and the guard bolt could then be fastened with a conventional nut.

An arm latch member 24 is located at a rear end of the arm 10 and is adapted to move rearward into engagement with the header latch member 20 such that the rear end of the arm 10 is maintained in substantially fixed vertical and lateral relationship to the header 4.

Figure 3:
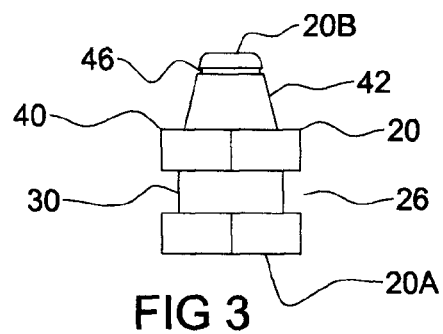
FIG. 3 is a side view of a header latch member of the latching mechanism of FIG. 1.
Figure 4:
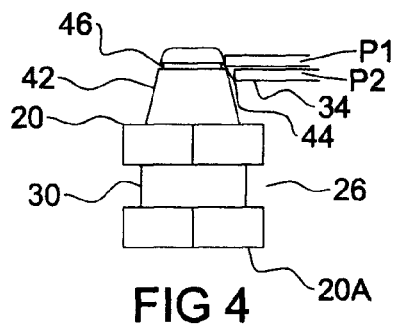
FIG. 4 is a side view of the header latch member of FIG. 3 showing the rear edge of the aperture in the spring element in upper and lower positions on the header latch member.
Figure 5:
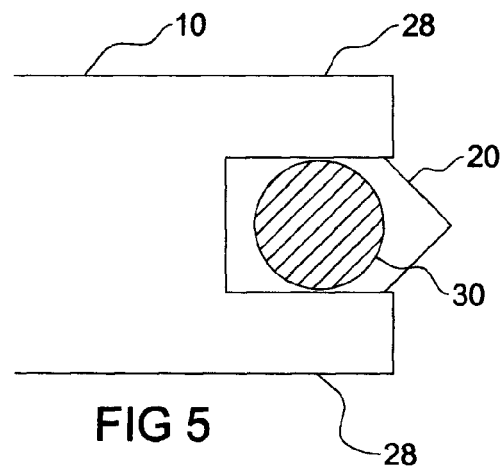
FIG. 5 is a schematic section view showing the legs of the arm latch member engaged in a groove on each side of the shaft of the header latch member.

As best seen in FIGS. 3-5, the header latch member 20 defines an annular leg groove 26, and the arm latch member 24 at the rear end of the arm 10 comprises two legs 28, as shown in FIG. 5, configured to engage the annular leg groove 26 on each side of the header latch member 20 with the shaft 30 of the header latch member 20 between the legs 28. Providing an annular leg groove 26 allows the header latch member 20 to be oriented in any direction and still have grooves on each side thereof to engage the legs 28. Thus with the legs 28 engaged in the annular leg groove 26, the rear end of the arm 10 is vertically and laterally fixed with respect to the header 4.

As the arm 10 is moved rearward to engage the arm latch member 24 with the header latch member 20 the guard finger 8 enters the guard finger aperture 12 defined by the aperture member 14 on the arm 10 forward of the arm latch member 24. Thus when the latch members 20, 24 are fully engaged, the guard finger 8 is fully engaged in the aperture member 14 and the lifter arm 10 and lifter 2 are thus secured to the header 4.

A releasable latch lock is operative to prevent forward movement of the arm latch member 24 with respect to the header latch member 20 and so maintains the lifter 2 secured to the header 4. In the embodiment of FIG. 1 the latch lock comprises a spring catch maintained in a closed position by a bias force and configured to be pushed open as the arm latch member 24 is moved rearward into engagement with the header latch member 20. The spring catch is configured to close when the latch members 24, 20 are fully engaged to prevent forward movement of the arm 10.

The spring catch comprises a spring element 34 attached to the arm 10 and defining an aperture 36 above the arm latch member 24. The spring element 34 is biased toward the arm latch member 24, and has a lip 38 extending rearward and outward from a rear end thereof. The spring element 34 is configured such that the spring element 34 is pushed outward by contact with the header latch member 20 as the arm latch member 24 is moved rearward into engagement with the header latch member 20, and moves inward when the latch members are fully engaged and the aperture 36 aligns with the top end of the header latch member 20. The spring element 34 thus maintains the header latch member 20 in the aperture 36 and prevents forward movement of the arm 10.

As illustrated in FIGS. 3 and 4, the header latch member 20 is attached to the header 4 such that a proximate end thereof 20A is adjacent to the header 4. As seen in FIG. 1, the vertical location of the header latch member 20 is adjusted by providing shims 37 between the header 4 and the header latch member 20 as required so that the bottom of the leg groove 26 is aligned with the top of the guard finger 8 such that the arm 50 can move rearward with the legs 28 in the leg groove 26 on each side of the shaft 30 of the header latch member 20. The guard bolt 22 extends through the shims 37 and into the threaded aperture through the header latch member 20 which acts as a nut for securing the bolt 22, and is tightened with a wrench on a hexagonal portion 40 thereof.

The header latch member 20 is attached to the header such that a rear wall of the header latch member slopes from a distal end of the header latch member rearward as it gets closer to the header. The illustrated header latch member 20 comprises a conical outer wall 42 sloping outward and downward from a distal end 20B opposite the proximate end 20A. No alignment is thus required, and when the header latch member 20 is installed on the header 4 the rear wall will always slope rearward as required.

As illustrated in FIG. 4, the rear edge 44 of the aperture 36 in the spring element 34 engages the outer wall 42, and the spring element 34 exerts a force toward the header 4 and the proximate end 20A of the header latch member 20 such that during installation the rear edge 44 of the aperture 36 in the spring element drops over the cone at the distal end 20B, as illustrated at P1 and moves rearward down the sloped wall 42 to a lower position P2, thereby tightening the arm latch member 24 to the header latch member 20.

In order to reduce wear and maintenance, the conical walls 42 of the header latch member 20 are made from a hardened steel material. A problem can arise during operations where a combination of vibration and forces encountered from contact with the crop and/or the ground can exert a force in a forward direction that will tend to pull the lifter 2 forward and overcome the downward bias force exerted by the spring element 34 such that the rear edge 44 moves up the sloped wall 42 and off the header latch member 20 such that the lifter is released and lost in the field.

To prevent the rear edge 44 from moving entirely off the header latch member 20, a small retention groove 46 is cut in the sloped wall 42 near the top thereof such that if the rear edge 44 starts to move upward along the sloped wall 42 from position P2, it will catch in the retention groove 46 and be stopped at position P1. Thus the spring element 34 can still perform the function of tightening the lifter 2 by forcing the rear edge 44 downward along the lower portion of the sloped wall 42, however if forces during operation should overcome the bias force and the rear edge 44 begins to move up the sloped wall 42 it will be stopped at the retention groove 46 and not lost in the field.

In the apparatus illustrated in FIG. 1, the header latch member 20 extends upward from the header 4 and the lifter arm 10 is also above the header 4 and oriented to engage the header latch member 20. FIG. 2 illustrates that the apparatus can also be configured to attach to the bottom of the header. The proximate end 120A of the header latch member 120 is attached by guard bolt 122 to the bottom of the header 104 and extends downward from the header 104. The lift arm 110 is also oriented under the header 104 to engage the header latch member 120 in the same manner as described above for the apparatus of FIG. 1.

Figure 6:
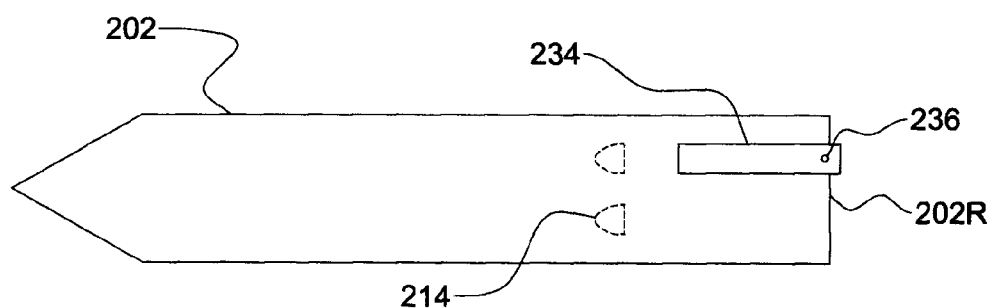
FIG. 6 is a schematic top view of a sunflower pan incorporating a releasable latch mechanism of the invention for attachment to a header.
Figure 7:
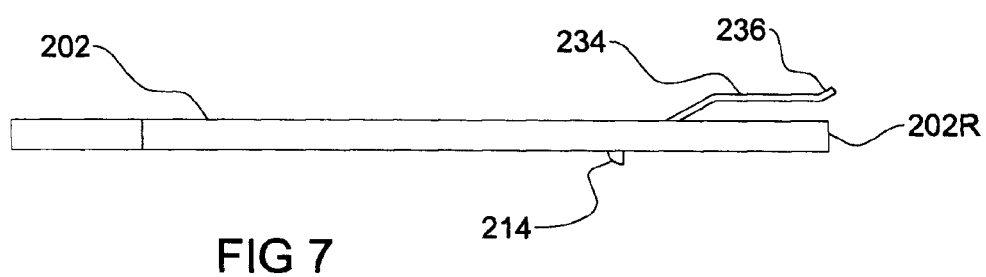
FIG. 7 is a side view of the sunflower pan of FIG. 6.

The illustrated latch mechanism can be used to similarly attach other crop accessories to a header. FIGS. 6 and 7 illustrate, for example, a sunflower pan 202 with an accessory latch member corresponding to the arm latch member 24 of FIG. 1, provided by a slot in the rear end 202R of the sunflower pan 202, and also a spring element 234 and aperture 236. The header latch member is mounted in the same fashion on the header, and the sunflower pan 202 is moved rearward such that guard fingers on the header enter guard finger apertures in aperture members 214 on the bottom of the sunflower pan 212 and the aperture 236 falls over the header latch member. It is contemplated that any number of like crop accessories could be attached with such a mechanism.

The lifter or other accessory is simply removed by lifting the rear end of the spring element up and over the header latch member, against the downward spring bias force, and pulling the accessory forward.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A crop accessory apparatus for attachment to a cutting header, the cutting header having a knife mounted along a lower front edge thereof and guards attached to the lower front edge with guard bolts such that guard fingers of the guards extend forward from the header, the apparatus comprising:
    a header latch member adapted for attachment to a guard bolt on the header such that a proximate end of the header latch member is adjacent to the header, and such that a sloping rear wall of the header latch member slopes from a distal end of the header latch member rearward and toward the header;
    a crop accessory with an accessory latch member at a rear end thereof, the accessory latch member adapted to move rearward, when the header latch member is attached to a header, into latching engagement with the header latch member such that the rear end of the accessory is maintained in substantially fixed vertical and lateral relationship to the header;
    the accessory latch member comprising a spring element defining an aperture therein, wherein the distal end of the header latch member moves into the aperture when the accessory latch member is engaged with the header latch member, and wherein the spring element is urged toward the header by a bias force such that a rear edge of the aperture is urged down the sloping rear wall and rearward, and such that the accessory is urged rearward into closer engagement with the header;
    a lateral retention groove in the sloping rear wall in proximity to the distal end of the header latch member, the retention groove operative to prevent the rear edge of the aperture in the spring element from sliding up and off the header latch member.

2. The apparatus of claim 1 wherein the sloping rear wall of the header latch member is provided by a conical portion of the header latch member.

3. The apparatus of claim 2 wherein the retention groove is provided by an annular groove extending around the surface of the conical portion.

4. The apparatus of claim 1 wherein the crop accessory defines a finger aperture and wherein a guard finger of a guard moves into the finger aperture when the accessory latch member moves into latching engagement with the header latch member attached to the header.

5. The apparatus of claim 1 wherein the header latch member defines a threaded hole therethrough and is adapted to be threaded on to the guard bolt in replacement for a nut that would conventionally be threaded onto the guard bolt.

6. The apparatus of claim 1 wherein the header latch member defines an annular leg groove adjacent to the proximate end thereof, and an arm latch member comprises two legs configured to engage the annular leg groove on each side of the header latch member with a shaft of the header latch member between the legs.

7. The apparatus of claim 1 wherein the crop accessory is one of a crop lifter and a sunflower pan.

8. A crop accessory apparatus for attachment to a cutting header, the cutting header having a knife mounted along a lower front edge thereof and guards attached to the lower front edge with guard bolts such that guard fingers of the guards extend forward from the header, the apparatus comprising:
    a header latch member having a distal portion with a sloping conical wall, the header latch member adapted for attachment to a guard bolt on the header such that a proximate end of the header latch member is adjacent to the header, and a conical distal end points away from the header;
    a crop accessory with an accessory latch member at a rear end thereof, the accessory latch member adapted to move rearward, when the header latch member is attached to a header, into latching engagement with the header latch member such that the rear end of the accessory is maintained in substantially fixed vertical and lateral relationship to the header;
    the accessory latch member comprising a spring element defining an aperture therein, wherein the distal end of the header latch member moves into the aperture when the accessory latch member is engaged with the header latch member, and wherein the spring element is urged toward the header by a bias force such that a rear edge of the aperture is urged down the conical wall and rearward, and such that the accessory is urged rearward into closer engagement with the header;
    an annular retention groove around the conical wall in proximity to the distal end of the header latch member, the retention groove operative to prevent the rear edge of the aperture in the spring element from sliding up and off the header latch member.

9. The apparatus of claim 8 wherein the header latch member defines a threaded hole therethrough and is adapted to be threaded on to the guard bolt in replacement for a nut that would conventionally be threaded onto the guard bolt.

\* \* \* \* \*